July 26, 1960  W. L. VERMILION, JR  2,946,832
ALKYLATION PROCESS
Filed May 14, 1958
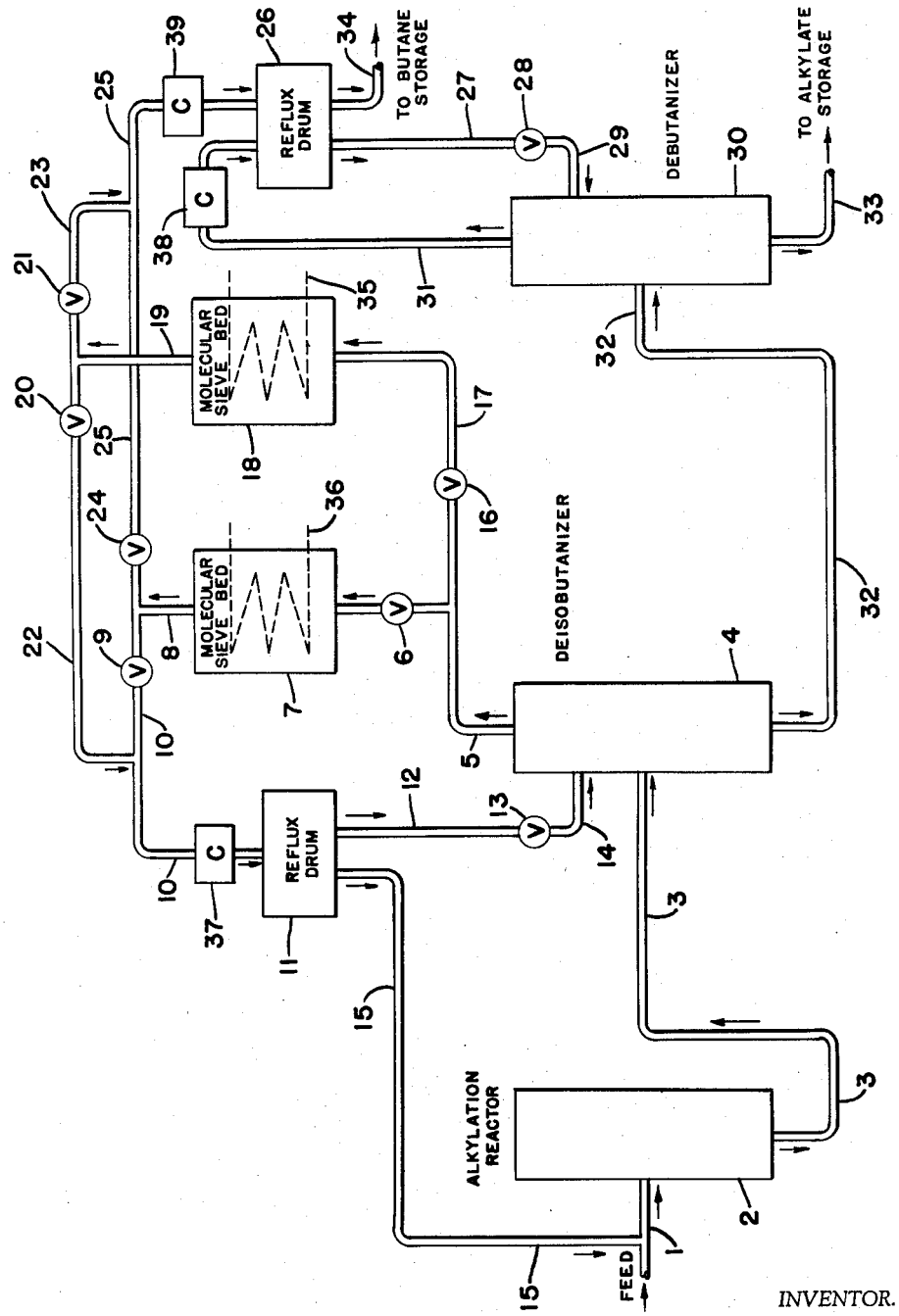
INVENTOR.
WILLAS L. VERMILION, JR.
BY
ATTORNEY

United States Patent Office 2,946,832
Patented July 26, 1960

2,946,832
ALKYLATION PROCESS

Willas L. Vermilion, Jr., Lakewood, Ohio, assignor to The Standard Oil Company, Cleveland, Ohio, a corporation of Ohio Filed May 14, 1958, Ser. No. 735,205

2 Claims. (Cl. 260—683.43)

This invention relates to an improved alkylation process. More particularly, it relates to a process for the alkylation of light hydrocarbons having an improved iso-paraffin recycle system.

Alkylation is a process which is widely practiced in the petroleum refining industry to produce liquid gasoline from normally gaseous hydrocarbons. It involves the reaction of low molecular weight iso-paraffins, such as isobutane with low molecular weight olefins such as propylene, butylenes, or amylenes. A particularly advantageous process is one in which isobutane is reacted with butylenes. This reaction will be employed hereinafter merely for the purposes of illustration, and it is not to be construed as a limitation on the scope of the invention.

As conventionally practiced, the alkylation process is usually conducted at low temperatures (about 40° F.) in the presence of a strong mineral acid catalyst, e.g., sulfuric or hydrofluoric acid. The manner of conducting the process and the conditions at which optimum results are obtained are all well known to those skilled in the art. Ordinarily, the feed to the process is a mixture of light hydrocarbons such as that produced in normal refining operations and it usually contains varying amounts of normal paraffins, iso-paraffins, and olefins. However, such mixtures are not the most desirable feed to an alkylation process in view of the n-paraffin content since it is primarily only the iso-paraffins which will alkylate. The normal paraffins do not react to any appreciable extent and serve merely as diluents in the reaction mixture.

It is known that the best results are obtained in an alkylation reaction when the iso-paraffins are present in a substantial molal excess as compared to the olefins. Since the streams available in the refinery as feed to the alkylation process do not ordinarily contain the desired substantial excess of iso-paraffins, it is customary to separate unreacted iso-paraffins from the reaction products and recycle them to the alkylation reactor.

As mentioned heretofore, alkylation feed will ordinarily contain non-reactive normal paraffins, as well as reactive iso-paraffins, and these appear in the effluent from the alkylation reactor. Consequently, the n-paraffins must be separated from the iso-paraffins before the iso-paraffins are recycle to the reactor since, otherwise, the normal paraffins would tend to accumulate gradually within the reactor system. This separation is difficult because of the close proximity of the boiling points of the normal paraffins and the iso-paraffins and, heretofore, it has been necessary to resort to expensive distillation equipment to accomplish the desired separation. A perfect separation of the n-paraffins from the iso-paraffins is impractical with conventional distillation equipment and consequently a substantial quantity of n-paraffins are circulated within the alkylation system.

Accordingly, it is the object of this invention to provide means for obtaining a more perfect separation of the normal paraffins from the iso-paraffins which are intended to complement conventional distillation facilities. More specifically, the object of this invention is to obtain a relatively pure iso-paraffin stream for recycle to the alkylation reactor so as to avoid the recycle of n-paraffins to the reactor.

In brief, the process of my invention comprises a conventional alkylation system in which the reactor effluent is subjected to a preliminary distillation step to remove a stream consisting essentially of iso-paraffins and a minor proportion of n-paraffins. This stream is next contacted with a bed comprising a special class of inorganic adsorbent which selectively removes the n-paraffins. The effluent from the adsorption zone consisting essentially of iso-paraffins is then recycled to the alkylation reactor. The bed of adsorbent material is periodically regenerated to remove the n-paraffins.

The adsorbent bed employed in this process is composed of a special class of inorganic adsorbents known as "molecular sieves." Molecular sieves are synthetic zeolites manufactured in such a manner as to have controlled specific porosity. The molecular sieves adsorb the normal paraffins by a mechanism of "exclusion." Molecules whose diameters are smaller than the pore openings of the sieves will enter the pores and thereby become adsorbed while molecules having diameters larger than the pores will be rejected by the sieves. Sieves are available in several pore sizes but for my purpose, I prefer a sieve having pore openings of about 5 A. since this size will adsorb normal butane and reject iso-butane.

The molecular sieves and the method of making them are fully described in British Patent 777,232 and also U.S. Patent No. 2,442,191, which are incorporated herein by reference.

The separation of the normal paraffins from the iso-paraffins may be accomplished by contacting the hydrocarbon feed mixture in either liquid or vapor phase with an adsorption bed, but the operation is preferably conducted in the vapor phase. The temperature during the adsorption in the vapor phase may range from 100 to 150° F. and the pressure from 85 to 125 p.s.i.g. The lower temperatures and higher pressures favor the adsorption of normal paraffins.

The molecular sieve beds may be desorbed by a number of methods which are well known to those skilled in the art. However, I prefer to desorb the beds by reducing the pressure and raising the bed temperature since this procedure precludes the introduction of extraneous material in the alkylation system.

The normal-paraffins obtained during the desorption steps are removed from the alkylation system and stored for future use. In an actual refinery installation, a battery of adsorption units may be employed, operated sequentially and linked by conventional means so that a steady recycle stream of iso-paraffins is supplied to the alkylation reactor.

The process for this invention will be better understood by reference to the attached patent drawing which presents in schematic form the process of the invention, and a discussion of this drawing now follows:

A refinery gas stream comprising butylenes, iso-butane, and n-butane together with recycle isobutanes, the source of which is described hereinafter, is introduced through line 1 into a conventional auto-refrigerated alkylation reactor 2, wherein the iso-butane and butylenes react. After treatment to remove residual acids, the reactor effluent flows through line 3 to a deisobutanizer 4 where a mixture comprising iso-butane and a significant quantity of normal butane is removed overhead through line 5.

The bottoms from the deisobutanizer 4 are sent through line 32 to the debutanizer 30 where normal butane is taken overhead through line 31, condenser 38, and a reflux drum 26. A part of the condensate is refluxed to the debutanizer through line 27, valve 28, and line 29, the remainder being sent to butane storage through line 34. The bottoms product from the debutanizer 30 is known as alkylate and this product is sent from the plant through line 33, either directly to storage, or it may be subjected to further fractionation (not shown).

The overhead stream from the deisobutanizer tower 4 comprising iso-butane and some normal butane is passed through line 5, valve 6, to the adsorbent bed 7. Normal butane is adsorbed on the bed and the effluent is relatively pure iso-butane which is conducted through line 8, valve 9, line 10, condenser 37 to reflux drum 11.

The adsorbent beds 7 and 18 are arranged in such a manner so as to supply a steady stream of iso-butane to reflux drum 11. While adsorbent bed 7 is on an adsorbing cycle, as heretofore described, adsorbent bed 18 is subjected to a desorption cycle. In order to switch the feed from bed 7 to bed 18, valves 6, 9, 21 are closed and valves 16, 20, 24 are opened.

Adsorbent bed 7, when it becomes loaded with normal butane, is desorbed by closing valves 6 and 9, opening valve 24, depressuring molecular sieve bed 7 and heating the bed 7 by passing steam through steam coil 36. The n-butane is removed through line 8, valve 24, line 25, condenser 39, into reflux drum 26.

Adsorbent bed 18 is loaded and desorbed in the same manner. The relatively pure iso-butane which accumulates in the reflux drum 11 is returned through line 15 to line 1, and finally to the alkylation reactor 2.

An example of the preferred embodiment of my invention now follows:

4,000 barrels per day of a refinery gas stream is fed to the alkylation reactor. This stream had the following composition:

| Component: | Vol. percent |
|---|---|
| $C_3$ | 3.0 |
| $i-C_4$ | 42.0 |
| $n-C_4$ | 15.0 |
| $C_4=$ | 35.0 |
| $C_5$ | 5.0 |

In addition, 6360 barrels per day of iso-butane were continuously recycled to the reactor. The reactor was maintained at a temperature of 40° F. and a pressure of 10 p.s.i. The catalyst employed in the reactor was 92.0% sulfuric acid.

The reactor effluent, after the customary cleanup, was transferred to a deisobutanizer containing 50 trays which was operated at a pressure of 100 p.s.i.g. and at a reboiler temperature of 240° F. 7500 barrels per day were taken as the overhead product from the deisobutanizer and this stream had the following composition:

| | Percent by volume |
|---|---|
| iso-Butane | 85 |
| n-Butane | 15 |

3100 barrels per day were removed from the bottom of the deisobutanizer and this stream was composed at 2450 barrels per day of alkylate and 600 barrels per day of n-butane (50 barrels of residual i-butane).

The overhead stream from the deisobutanizer was transferred in the vapor phase to a vessel containing 125,000 lbs. of a synthetic zeolite adsorbent having an average pore opening of about 5 angstroms. The vapor comprising relatively pure iso-butane issuing from the adsorber was condensed by conventional means and 10,000 barrels per day of the condensate were recycled to the alkylation reactor with the remainder being employed as reflux to the deisobutanizer. During this operation, the bed of adsorbent material was maintained at a temperature of 130° F. and at a pressure of 95 p.s.i. After 6 hours of continuous operation, the adsorption bed became loaded as evidenced by the appearance of n-butane in the vaporous product issuing from the vessel. At this time, the overhead from the deisobutanizer was switched to another and similar vessel containing adsorbent material and the conditions of the vessel containing the loaded adsorbent were adjusted to a temperature of 350° F. and a pressure of 65 p.s.i. The latter change in conditions resulted in the desorption of the adsorbent material and a total of 50 barrels of n-butane were recovered by this step. The desorbed adsorbent was then subjected to another cycle with feed from the deisobutanizer overhead with similar results.

Thus, it can be appreciated that the process of the invention has a number of advantages over the conventional process. One of these is that the process produces a relatively pure iso-butane stream which may be employed as recycle to the alkylation reactor and as reflux in the deisobutanizer. Elimination of the n-butane from the recycle stream improves the alkylation reaction since a useless diluent is eliminated, and at the same time, the capacity of the reactor is increased by an amount equivalent to the amount of n-butane removed from the recycle stream. Furthermore, the elimination of n-butane from the reflux to the deisobutanizer increases the separation efficiency of that tower.

I claim:

1. An alkylation process comprising the steps of contacting a normally gaseous hydrocarbon mixture comprising iso-alkanes, olefins and n-alkanes with a catalyst in a reaction zone under alkylation conditions, withdrawing a mixture of product and unreacted feed material from said reaction zone, introducing said mixture of product and unreacted feed material into a distillation zone and adjusting the temperature and pressure in said distillation zone so as to separate a mixture comprising substantially all of the iso-alkanes and a part of the n-alkanes from said mixture, passing said mixture of iso-alkanes and n-alkanes to an adsorption zone containing a bed of molecular sieves having an average pore size of about 5 angstroms and recovering therefrom a stream consisting essentially of iso-alkanes, and finally returning at least part of said iso-alkane stream to said distillation zone as reflux and recycling the remainder of said iso-alkane stream to said reaction zone.

2. An alkylation process comprising the steps of contacting a normally gaseous hydrocarbon mixture comprising iso-butane, butylenes and n-butane with a catalyst in a reaction zone under alkylation conditions, withdrawing a mixture of product and unreacted feed material from said reaction zone, introducing said mixture of product and unreacted feed material into a distillation zone and adjusting the temperature and pressure in said distillation zone so as to separate a mixture comprising substantially all of the iso-butane and a part of the n-butane from said mixture, passing said mixture of iso-btuane and n-butane to an adsorption zone containing a bed of molecular sieves having an average pore size of about 5 angstroms and recovering therefrom a stream consisting essentially of iso-butane, and finally returning at least part of said iso-butane stream to said distillation zone as reflux and recycling the remainder of said iso-butane stream to said reaction zone.

References Cited in the file of this patent

UNITED STATES PATENTS

| 2,429,205 | Jenny et al. | Oct. 21, 1947 |
| 2,442,191 | Black | May 25, 1948 |
| 2,695,321 | Cines | Nov. 23, 1954 |
| 2,818,455 | Ballard et al. | Dec. 31, 1957 |